United States Patent [19]
Alter et al.

[11] Patent Number: 5,949,838
[45] Date of Patent: Sep. 7, 1999

[54] MANUFACTURE OF MATERIALS AND WORKPIECES FOR COMPONENTS IN NUCLEAR PLANT APPLICATIONS

[75] Inventors: Dietrich Alter; Peter Dewes, both of Erlangen; Friedrich Garzarolli, Höchstadt/Aisch; Roland Hahn, Forchheim, all of Germany; J. Lawrence Nelson, Cupertino, Calif.

[73] Assignee: Electric Power Research Institute, Inc., Palo Alto, Calif.

[21] Appl. No.: 09/032,246

[22] Filed: Feb. 27, 1998

Related U.S. Application Data

[63] Continuation of application No. 08/436,407, filed as application No. PCT/US92/11261, Dec. 18, 1992.

[51] Int. Cl.⁶ ..................................................... G21C 3/06
[52] U.S. Cl. ......................... 376/260; 376/457; 376/900; 148/327
[58] Field of Search ..................... 376/260, 457, 376/900; 420/43; 148/327

[56] References Cited

U.S. PATENT DOCUMENTS

| | | | |
|---|---|---|---|
| 3,723,102 | 3/1973 | Lowe | 148/327 X |
| 4,797,252 | 1/1989 | Eckenrod et al. | 420/43 |
| 4,836,976 | 6/1989 | Jacobs | 376/305 |
| 4,863,682 | 9/1989 | Coates et al. | 376/457 |
| 5,203,932 | 4/1993 | Kato et al. | 148/327 X |

FOREIGN PATENT DOCUMENTS

| | | |
|---|---|---|
| 563843 | 9/1958 | Canada . |
| 0 288 245 | 10/1988 | European Pat. Off. . |
| 0 332 460 | 9/1989 | European Pat. Off. . |
| 2 175 526 | 10/1973 | France . |
| 2 266 263 | 10/1975 | France . |
| 3341 296 C1 | 3/1985 | Germany . |
| 60-017058 | 1/1985 | Japan . |
| 62-107048 | 5/1987 | Japan . |
| 62-120463 | 6/1987 | Japan . |
| 6403838 | 10/1964 | Netherlands . |
| 436 736 | 3/1967 | Switzerland . |
| 468 467 | 2/1969 | Switzerland . |
| 905 238 | 9/1962 | United Kingdom . |
| 1 486 064 | 9/1977 | United Kingdom . |

*Primary Examiner*—Daniel D. Wasil
*Assistant Examiner*—Matthew J. Lattig
*Attorney, Agent, or Firm*—Pennie & Edmonds LLP

[57] ABSTRACT

A method of producing austenite steel for use in the radiation zone of a nuclear reactor. The method comprising the steps of forming the austenite steel with about 17% by weight chromium, about 9 to 11.5% by weight nickel, about 0.04% by weight carbon, and iron impurities whose content of silicon is about 0.1% by weight and whose total content of sulfur and phosphorous is less than 0.03% by weight; and exposing the austenite steel to a temperature treatment at a temperature less than 1150° C. to produce a fine grain lattice with grain diameter features under approximately 20 μm.

9 Claims, 10 Drawing Sheets

MANUFACTURE OF MATERIALS AND WORKPIECES FOR COMPONENTS IN NUCLEAR PLANT APPLICATIONS

This is a continuation of application Ser. No. 08/436,407, which is the national stage application of PCT/US92/11261 filed on Dec. 18, 1992.

TECHNICAL FIELD

This invention concerns the manufacturing of austenitic grade materials for radiation exposure applications.

BACKGROUND ART

The starting point is an austenitic steel whose alloying constituent quantities are largely standardized, e.g., steel carrying the German Stock Number 1.4550 which require a carbon content under 0.1%, a niobium content higher than the eight fold of the carbon content, as well as a chromium content of 17 to 19 wt. %, and a nickel content from 9 to 11.5 wt. %. Impurities level limits are set at 2.0% Mn, 1.0% Si, 0.045% P and 0.03% S by weight.

The properties of iron are modified by the prescribed amounts of the alloying components with the upper limits on impurities dictated by the specified application zone. Higher impurity limits are generally allowed to make it possible to manufacture alloys from standard, inexpensive source materials which conform to commercial impurity standards. The upper limits of many impurities are the result of optimized manufacturing processes. Concentration limits on other alloying constituents are determined through the optimization of pertinent material properties. Steel qualities 1.4301 and 1.4401, for example, contain niobium as an impurity, but otherwise correspond to the usual impurities of 1.4550 steel. In the U.S., the corresponding steel qualities approximately correspond to markings AISI types 348, 304, and 316.

The microstructure of these materials depends upon their composition, thermal treatment and other procedural steps during the manufacturing process. If for example, the material is subjected to high temperatures for extended periods, large grains will form. Impurities and/or the use of lower temperatures during manufacturing discourages grain growth. The formation of coarse grains can be promoted in some cases during forging, where extensive deformation of grains at elevated temperature causes larger grains to be formed when the forging cools. These grains can be reduced through recrystallization. Grain structure affects material properties such as ductility and strength.

Austenitic steels distinguish themselves from other steels because they have suitable mechanical properties while simultaneously possessing a high level of stability in the face of general corrosion, the even removal of material from the surface of a component, a fact which led to early use of austenitic steels as the material of choice for high stress nuclear reactor internal structural components. Industry experience and laboratory testing has show that these materials fail when exposed to low stress, a matter which can be traced back to selective corrosion at grain boundaries ("intergranular stress corrosion cracking", IGSCC). This selective attack on the grain boundaries can be examined outside the reactor in laboratory tests ("outpile test") by conducting corrosion tests under special aggressive conditions. The results of such tests, show that austenitic steel which is resistant to IGSCC when not exposed to radiation, does fail during inpile testing where radiation is present. The in-reactor failure mechanism is therefore called "irradiation assisted stress corrosion cracking" ("IASCC"). It is suspected that phosphorus and silicon are forced to the grain boundaries leading to a susceptible site for the onset of corrosion. Supported by outpile IGSCC tests, the articles "Behavior of Water Reactor Core Materials with Respect to Corrosion Attack" by Garzarolli and Rubel and Steinberg's "Proceedings of the International symposium on Environmental Degradation of Materials in Nuclear Power Systems—Water Reactors", Myrtle Beach, S.C., Aug. 22–25, 1983, Pages 1 through 23, recommend that the silicon content be maintained under 0.1 wt. % and the phosphorus content be kept under 0.01 wt. %, while pointing out that irradiation in a reactor enhances the occurrence of selective corrosion.

In "Deformability of Austenitic Stainless Steel and Ni-Base Alloys in the Core of a Boiling and a Pressurized Water Reactor", Proceedings of the 2nd International Symposium on Environmental Degradation of Materials in Nuclear Power Systems—Water Reactors, Monterey/Calif., Sep. 9–12, 1985, Pages 131 to 138, Garzarolli, Alter and Dewes report results from inpile tests that provide some insight into the influence of phosphorus, silicon, and sulfur impurities on IASCC. Standard steel qualities of stock numbers 1.4541, AISI 316 and 348, were subjected to annealing temperatures of 1050° C. and then cold worked approximately 10%. A chemical analysis was performed to determine alloying constituents for each standard to be tested. AISI 348 steel samples had a silicon and phosphorus content (0.59% and 0.017%, respectively). This was lowered, for use as additional samples of "clean" AISI 348, to 0.01% and 0.008% by a special cleaning procedure. The sulfur content was not analyzed but the remainder of this "clean" steel was composed of 0.041% C., 11.1% Ni, 17.7% Cr, 1.65% Mn and 0.76% Nb+Ta by weight. Temperatures used during the annealing processes that followed the cold work were not closely monitored, but did not in any case exceed 1040° C., yielding a grain size of ASTM No. 9.

The sample with the lowest impurity content showed a considerably reduced corrosion rate during outpile tests. Tubes made of the two types of AISI 348 steel were filled with a ceramic that expands when exposed to irradiation, for inpile tests. These tests showed that only the cleaner material remand relatively undamaged with a diametrical-swelling of 0.7% and even 1.4% following irradiation.

Follow-on tests with newly manufactured tubes showed that these positive results occurred at random and could not be reproduced. The factors and parameters obtained coincidentally during the aforementioned successful tests, which could not be replicated or controlled, obviously have an influence on IASCC.

The nuclear industry has learned from its experience with zirconium alloys, that oxygen causes embrittling and a higher incidence of corrosion. It is suspected that nitrogen has a similar influence on austenitic steel, and it was recommended that austenitic steels be used which contain from 0.025% to 0.065% carbon and 1.5 to 2% manganese, which then show a maximum content of 0.03% N, 0.005% P, 0.05% Si and 0.005% S (U.S. Pat. No. 4,836,976).

Long term reactor tests show, however, that the use of these or similar materials, i.e., P, S, N and Si reduced, could not attain the ductility and resistance with regard to IASCC in individual tests. Systematically varying the N-content did not show any particular influence on the impurity content. All clean variants failed during inpile tests, which means that the previously found high resistance for the aforementioned one-time material must be considered coincidental, whose cause lies in the random, unavoidable variations of the composition and/or manufacturing processes.

The exact mechanisms and contributing factors to IASCC as well as the suitable measures for its avoidance are largely unknown because of the rather extensive list of possible influences, longer reactor testing periods, and substantial cost associated with a comprehensive test series. The task of manufacturing tubes for absorber elements or other structural components for reactor irradiation zones out of a suitable austenitic steel, that are sufficiently resistant to IASCC and can be exposed to the stress of long term reactor operation, still remains unfulfilled. This invention is the key to finding the solution to this task.

DISCLOSURE OF INVENTION

The intent is to reliably reproduce the one-time, randomly produced material condition which possesses the desired mechanical and corrosive properties. It is impossible to "exactly" reproduce the known material parameters at a justifiable expense: (austenitic steel composed as follows: 11.1% Ni, 17.7% Cr, 1.65% Mn, 0.76% Nb and Ta, 0.01% Si, 0.008% P, manufactured by thermal treatment of a large-grained blank at temperatures up to 1040° C. and bearing the ASTM Number 9). It is also unknown whether other material parameters, not studied or controllable, could be responsible for the observed positive results. According to the findings, specific parameters can be selected, controlled, and applied to obtain the desired results. With the said parameters being sufficient to attain the positive results, others, which may encompass previously examined or as of yet unexamined parameters could play an accompanying role as a contributor toward the pertinent beneficial property.

A controlled application is not required to obtain other parameters. They can be gotten from the requirements of other mechanical processes or as coincident. The material or corresponding workpiece manufactured according to the invention differentiates itself from the one-time or randomly manufactured material by having a reproducible resistance to IASCC.

The invention proceeds from the assumption that phosphorous, sulfur and silicon impurities are particularly responsible for IASCC when they segregate to grain boundaries. The content of these impurities can be reduced with regard to customary steel qualities by using appropriate cleaning procedures, but it is not possible to completely remove all impurities. The average grain diameter of such a workpiece tends to increases as the impurity concentrations decrease; the number of grains and total grain boundary surfaces decrease to the point where it is now possible to end up with an accumulation of an excessive number and concentration of impurities on the reduced boundary surfaces.

The invention also proceeds from the premise that higher disruptive segregation of impurities can be avoided if there are enough collection points in the material where impurities could be captured. Finely dispersed carbides would be suitable collection points for this propose. The invention provides an austenitic steel tailored for used in irradiation zones of a reactor. This steel has a reduced silicon, phosphorous and sulfur content. The grain size is sufficiently fine with an overall carbon content that favors, with properly controlled thermal processing, the formation of finely dispersed carbides of the alloying additions present in steel, as opposed to commercial steel with their technically practical purities and microstructures.

The preferred alloying element for carbide formation is niobium which could range in concentration from as low as 0.4 wt. % to as much as 0.9 wt. %. The preferable range of niobium concentration is between 0.7 and 0.85% by weight.

The carbon content can be as much as 0.06%, but is preferred to be around 0.04% by weight. The preferred niobium/carbon ratio range is from approximately 10:1 to 30:1.

Advantageous carbide precipitations would have a diameter between 20 nm and 250 nm for spherical shapes and/or up to 750 nm for needle shapes. The diameters are based on optical readings of the intercept lengths, which are similar to that used in US Standard ASTM E 112 for grain size, obtained from high magnification scanning electron micrographs.

The upper limit on silicon is 0.1% by weight, while good test results are obtainable with a maximum silicon content of 0.08%.

The total content of phosphorous and sulfur should be under 0.03%, and preferably under 0.02%. Good results can be obtained when the phosphorous and sulfur contents are under 0.008%.

The invention provides that components or workpieces, that are to be made of steel and used in irradiation zones of a reactor, be manufactured from austenitic steel. This steel will require a base melt reduced in Si, P and S content after solidification. A thermal heat treatment that will result in a finely dispersed carbide precipitate, with the alloyed carbide former, is desired. Annealing temperatures between 1000 and 1100° C. are sufficient with a standard annealing temperature of approximately 1050° C. preferred to obtain a mean grain diameter (with an intercept length based on U.S. Standard ASTM-E 112) under approximately 20 $\mu$m. This is the case when niobium in concentrations between 0.4 and 0.9% is used as the carbide former and only a small portion of the carbides present in a coarser distribution. Higher annealing temperature (e.g., at approximately 1150° C.) can be used, particularly if coarser carbide precipitations need to be dispersed, and if only one low temperature stabilizing process (under 800° C.) is anticipated to form the finely dispersed carbide distribution. These annealings can also be combined with mechanical processing steps at elevated temperatures (e.g., hot rolling) to get the desired structure.

The fabrication process of the corresponding semi-finished steel customarily starts with a blank which is already handled at temperatures of over 1100° C. State of the art technology anticipates that blanks will be further processed at annealing temperatures of approximately 1050° C. ("standard annealing") so that any non-uniformities or other structural defects which could have formed during forging, extruding or other similar mechanical processes, which could lead to a ripping or bursting of the metal, can be removed. The desired structure of the metal limits the temperatures which are available during fabrication, but lowering temperatures during the intermediate processes can be equalized by extending the duration of the processes.

The attainment of advantageously reduced silicon, phosphorous and sulfur content in the base material can be realized though good melting practices or though refined cleaning procedures. Cleaning takes place through a one-time melting or multiple remelting under vacuum. The use of a cover gas (e.g. argon) is also possible and is advantageous for intermediate annealing process.

A silicon content of 0.1% and a common phosphorous and sulfur content of less than 0.03% is advantageous to maintain a purity level. Carbon content is permissible in the 0.03 to 0.05% range and should generally not exceed 0.06%.

A niobium content of 0.9% by weight content is advantageous as a carbide former when a niobium-carbon ratio is in the range of 10:1 to approximately 30:1.

Commercial austenitic steels generally have a grain structure with grain diameters that can exceed 50 $\mu$m, depending upon how much Si, P and S has been removed. This provides for a ductile material that is not only resistant to general corrosion but also resistant against stress corrosion cracking when in a non-irradiated condition.

In the non-irradiated state, commercial austenitic steel can withstand relative length expansion, dL, of up to 30% without incurring damage. This means that sealed pipes can withstand large changes in diameter, dD, caused by an increase of internal pressure. This occurs, when the filling, such as nuclear fuel or other absorbing material, within a pipe swells and presses against the pipe from the inside.

After this material has been subjected for an extended period to a high neutron flux, the limit for relative length expansion, dL, or relative diameter change, dD, can occur. The resulting values of dD fall in a large scatter band, with a typical value of only approximately 0.5%. The reasons for the scatter could be due to the uncontrollable impurities which are present in the indicated maximum values, or due to the deviations in grain structure and size, dependent on random occurrences during the manufacturing process that are unknown. The reduced ductility is due to an increase occurrence of IASCC, which means that austenitic steel has a limited use in nuclear reactors.

The invention's workpiece, in contrast, still shows sufficient ductility following a neutron exposure. It is possible for values of 1.5% or higher, in dD, to be reliably withstood without damaging the workpiece.

BRIEF DESCRIPTION OF THE DRAWINGS

The invention is explained in more detail by means of an expanded material test series which is reproduced in Tables 1, 2 and 3, as well as in 16 figures, as follows:

Table 1 The chemical composition of different alloys of the test series

Table 2 Temperature treatments and grain diameters of these materials

Table 3 Chemical composition of additional successful test steels

Figure 1:
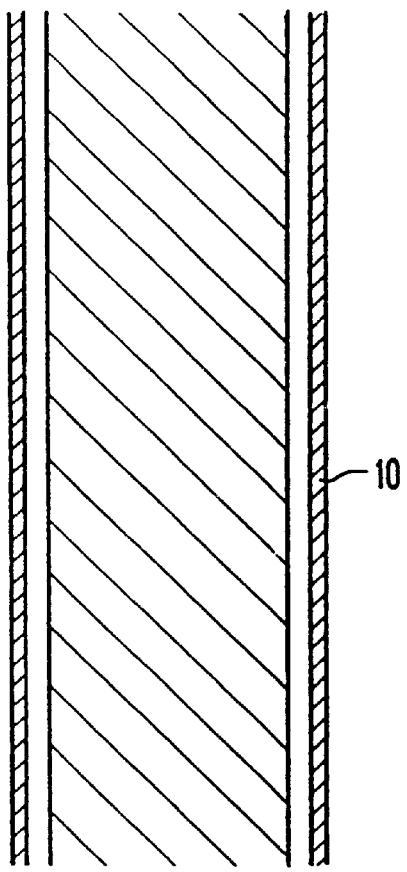
Figure 2:
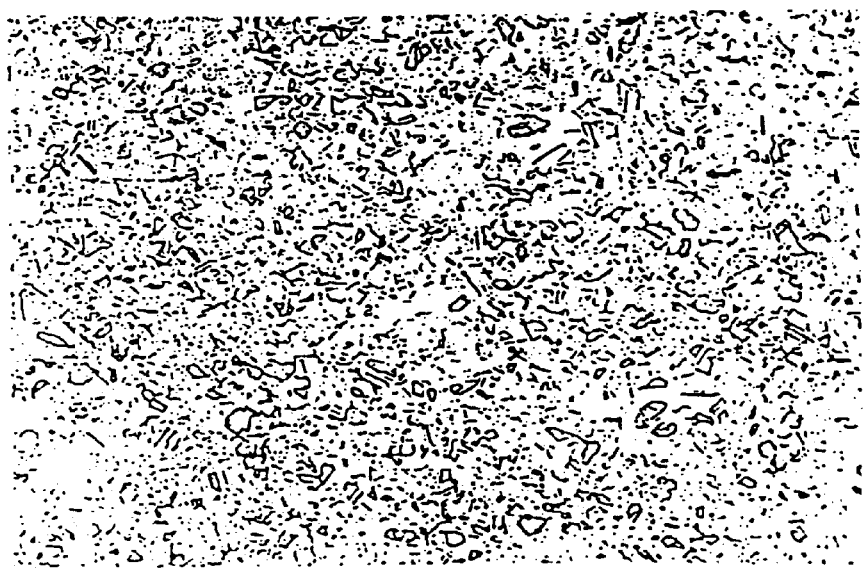
Figure 3:
Figure 4:
Figure 5:
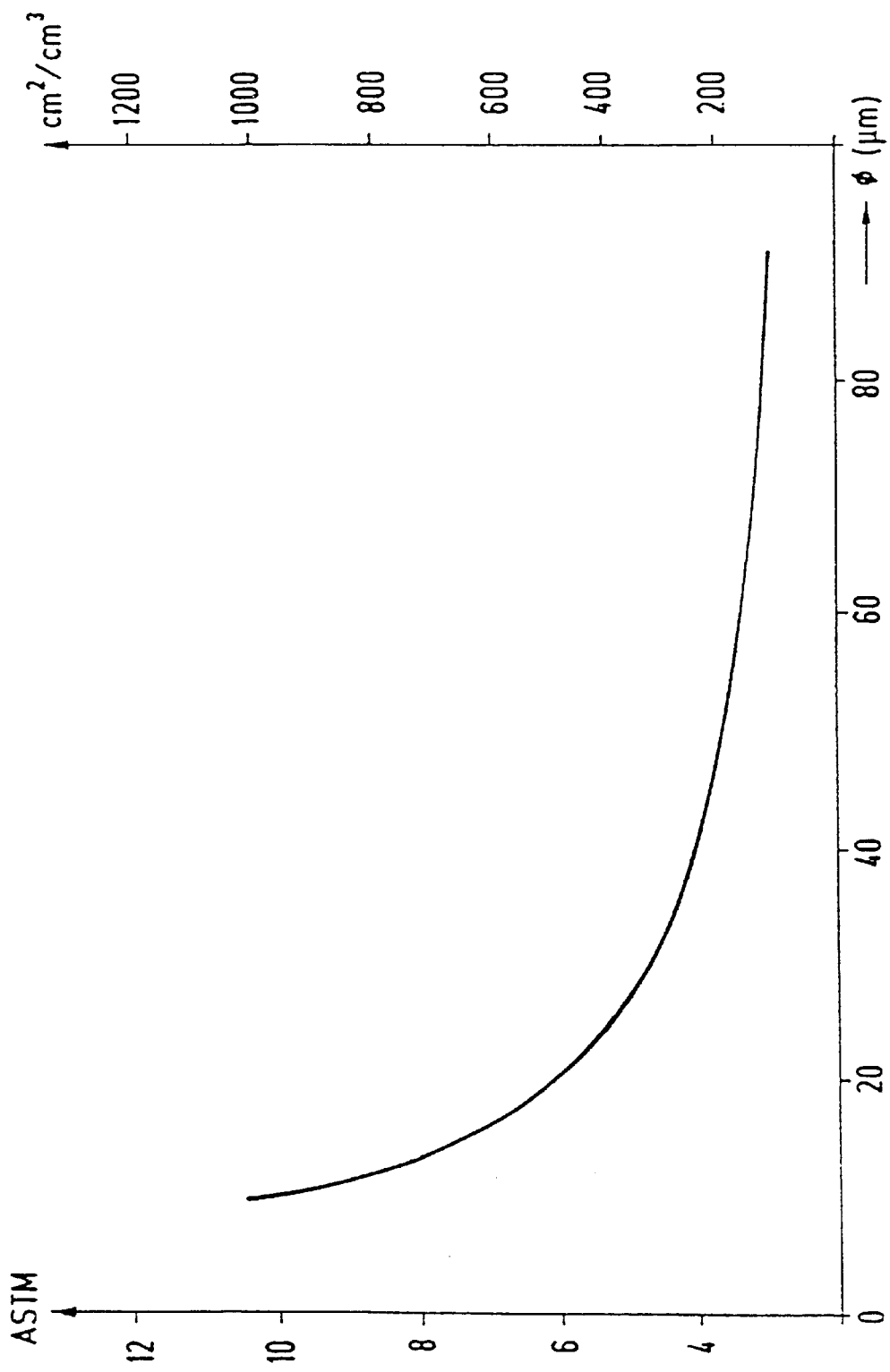
Figure 6:
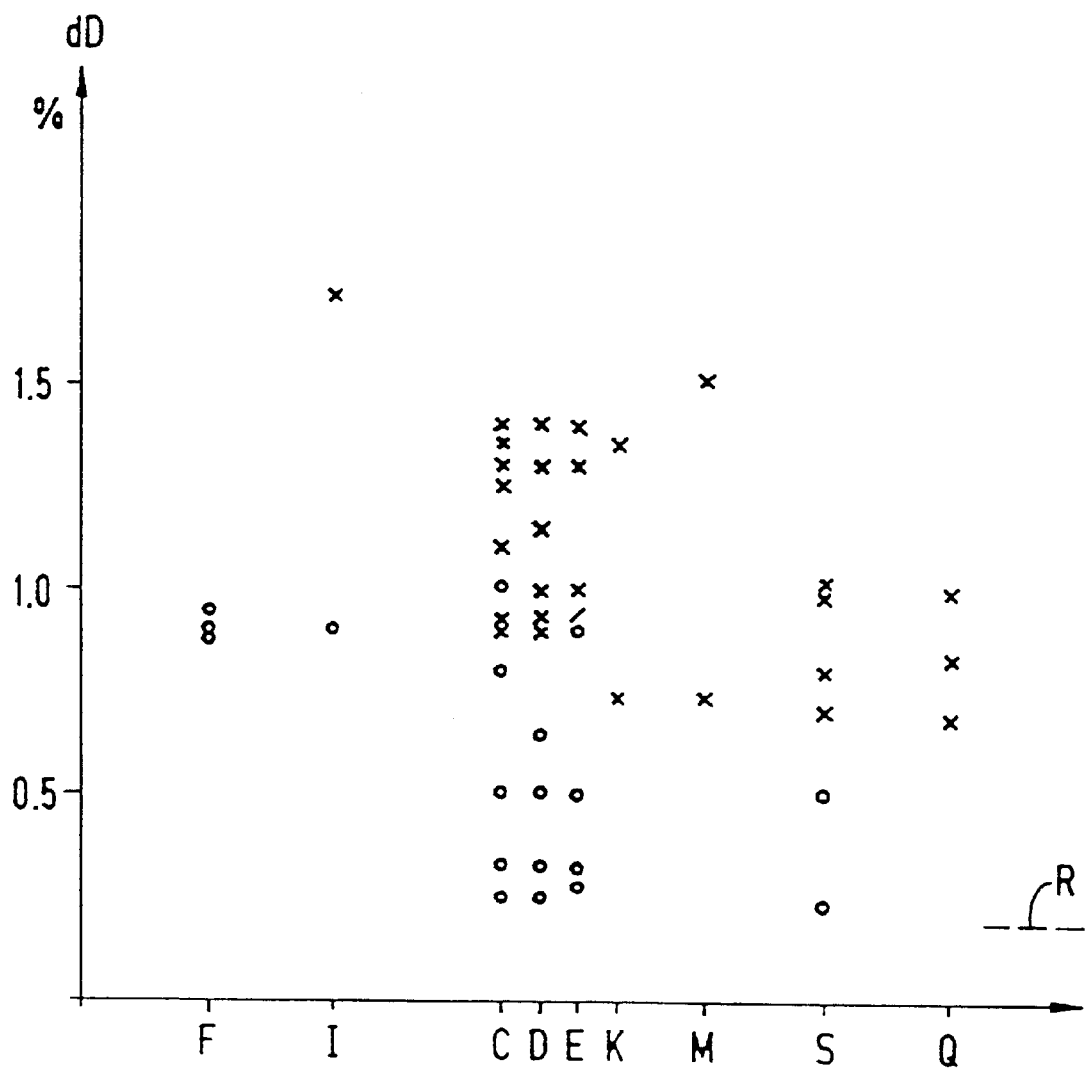
Figure 7:
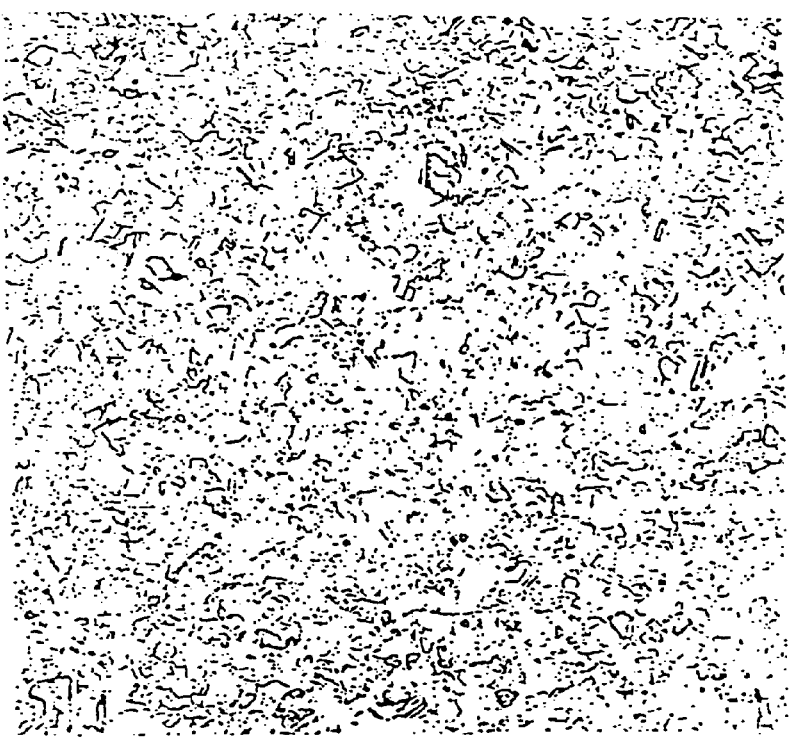
Figure 8:
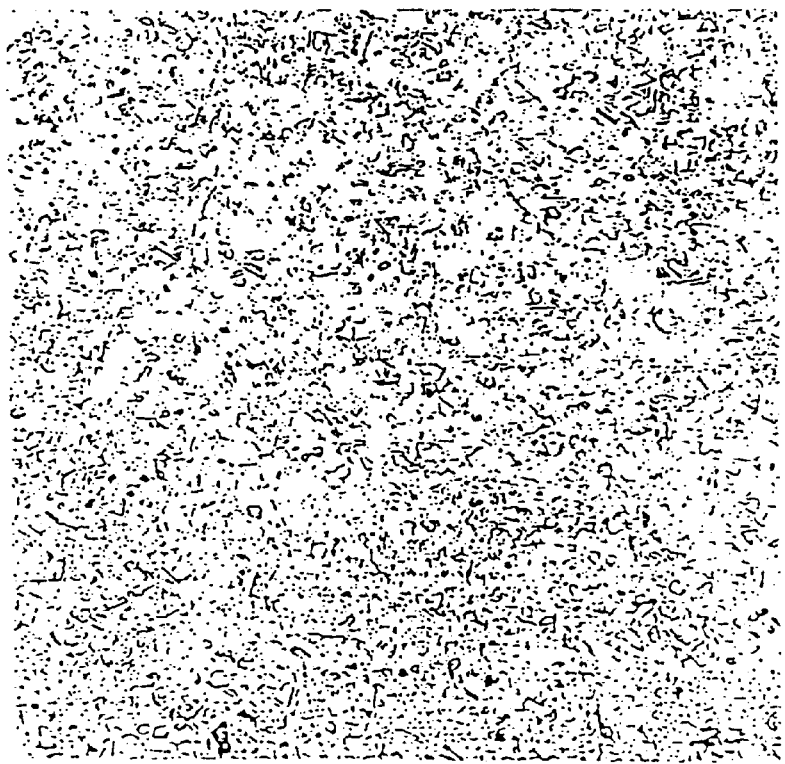
Figure 9:
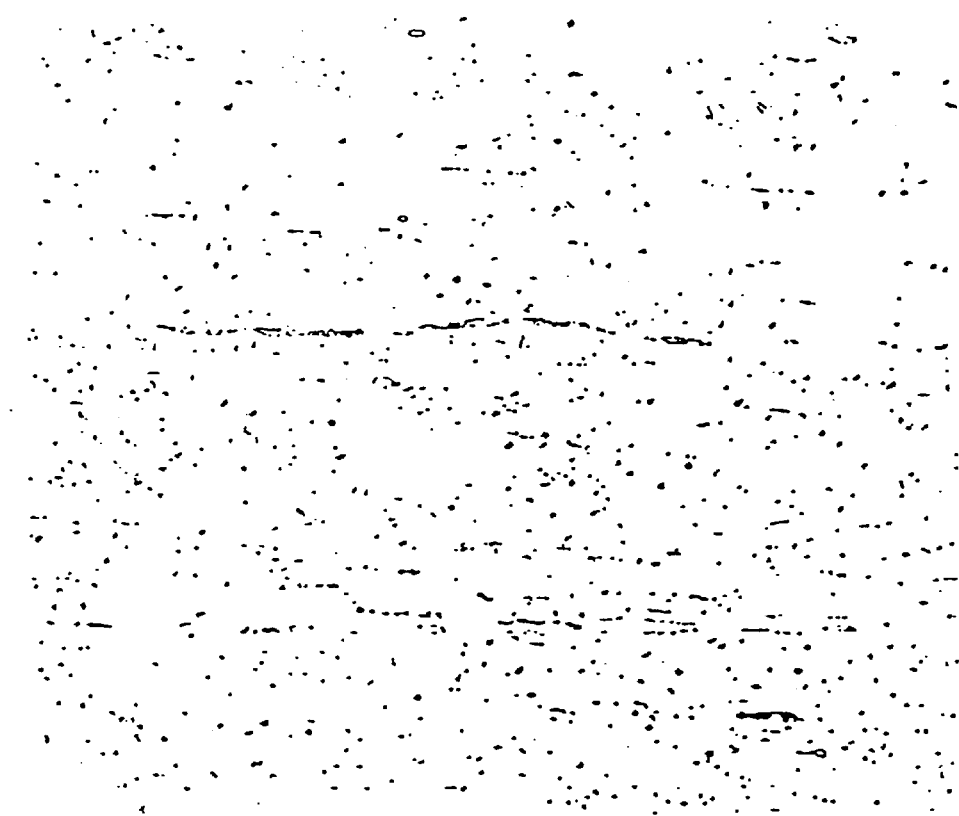
Figure 10:
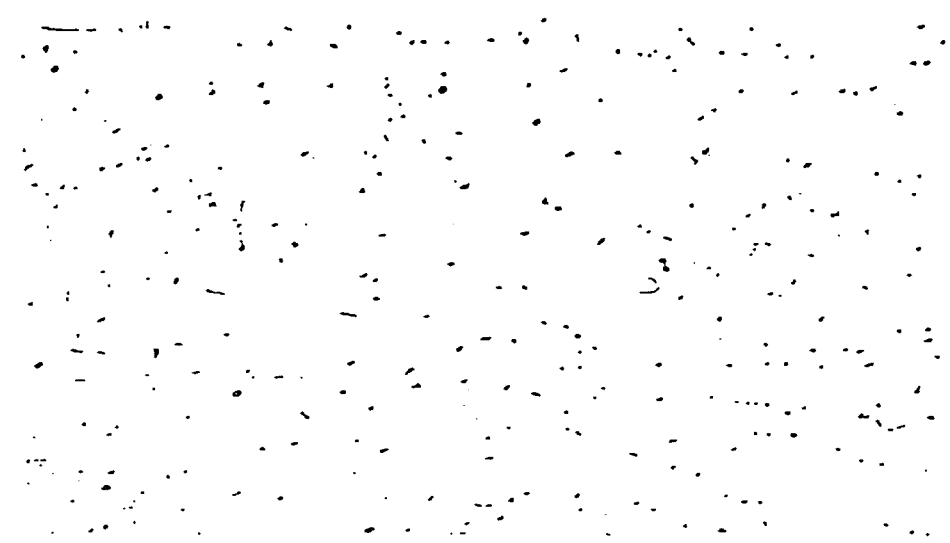
Figure 11:
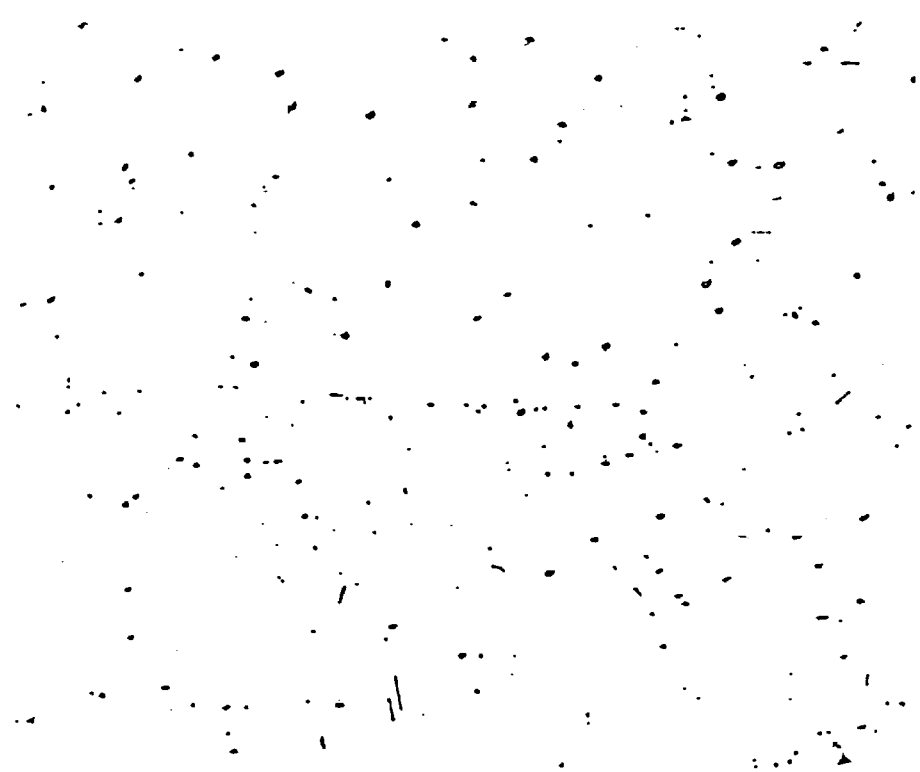

FIG. 1 A pipe filled with material capable of expanding and specifically manufactured for this test series FIG. 2–4 The relationship of grain size to temperature treatment of the same composition materials FIG. 5 Relation between grain size and grain boundary surface FIG. 6 Ductility levels attained at different temperature treatments FIGS. 7–8 The change in grain size in relationship to FIG. 4 using the same temperature treatments but with different niobium contents FIGS. 9–11 The formation of non-metallic precipitates and the precipitates of inter-metallic inclusions for the structures of FIGS. 4, 7 and 8

Figure 12:
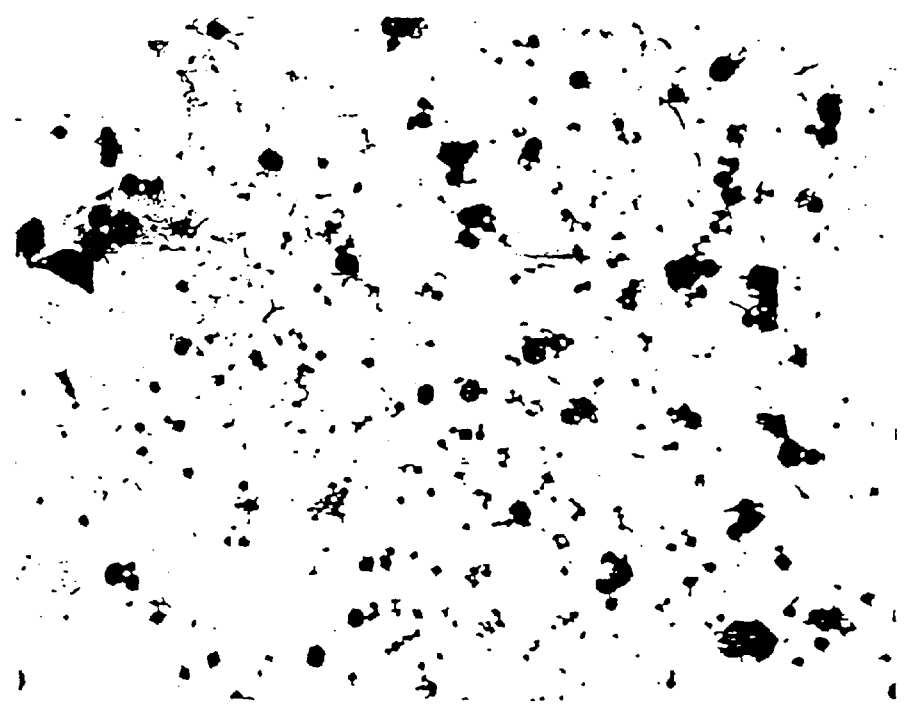
Figure 13:
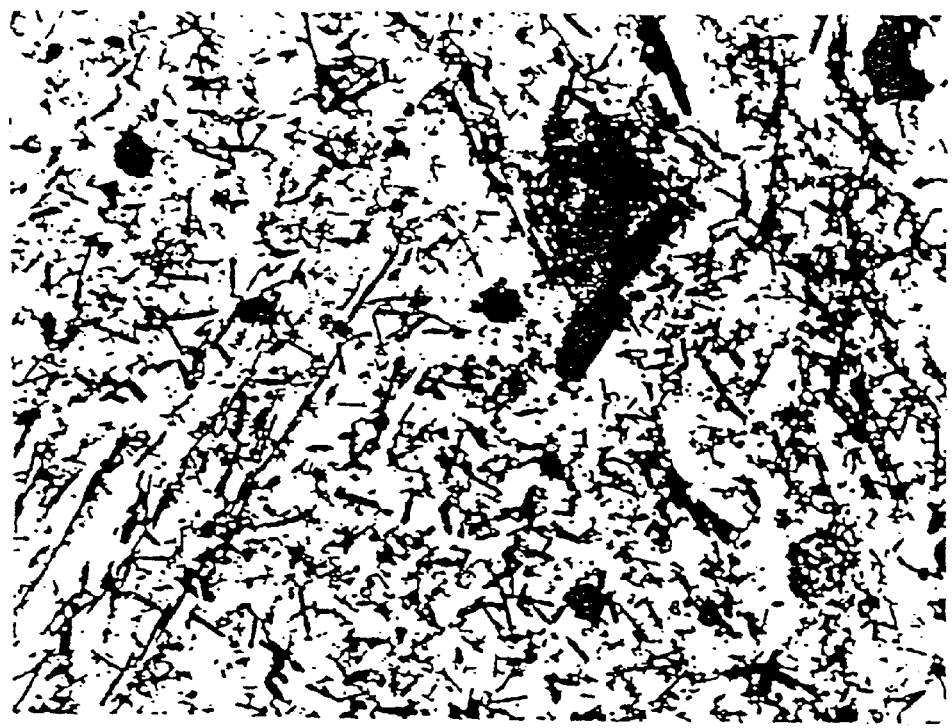
Figure 14:
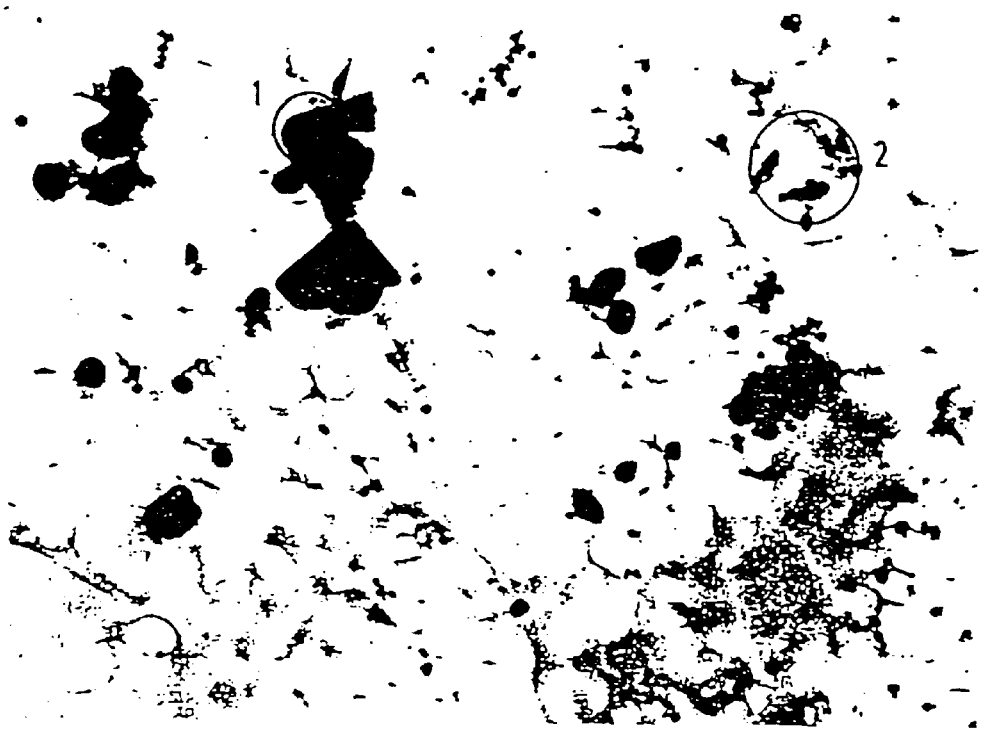

FIGS. 12–14 The precipitates of niobium carbides which occur in the structures of FIGS. 9 through 11.

Figure 15:
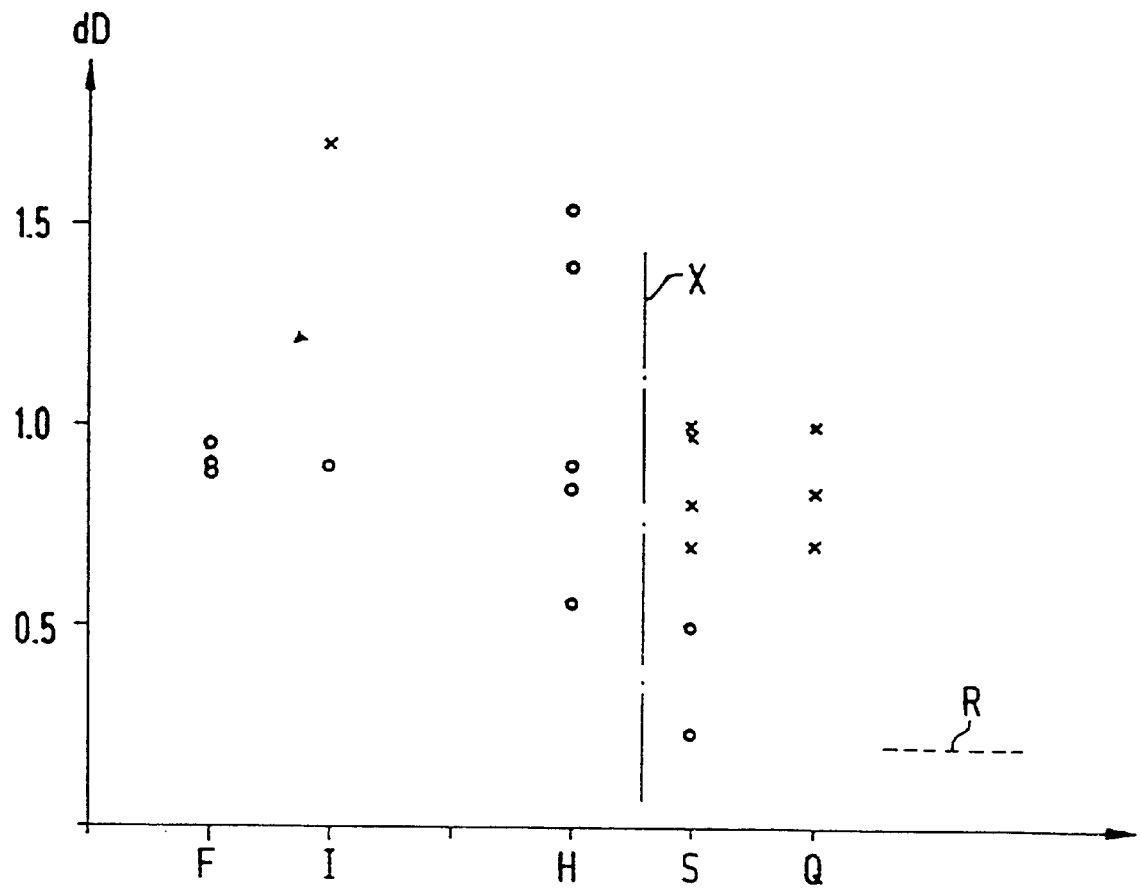

FIG. 15 Resulting ductility and grain size.

Figure 16:
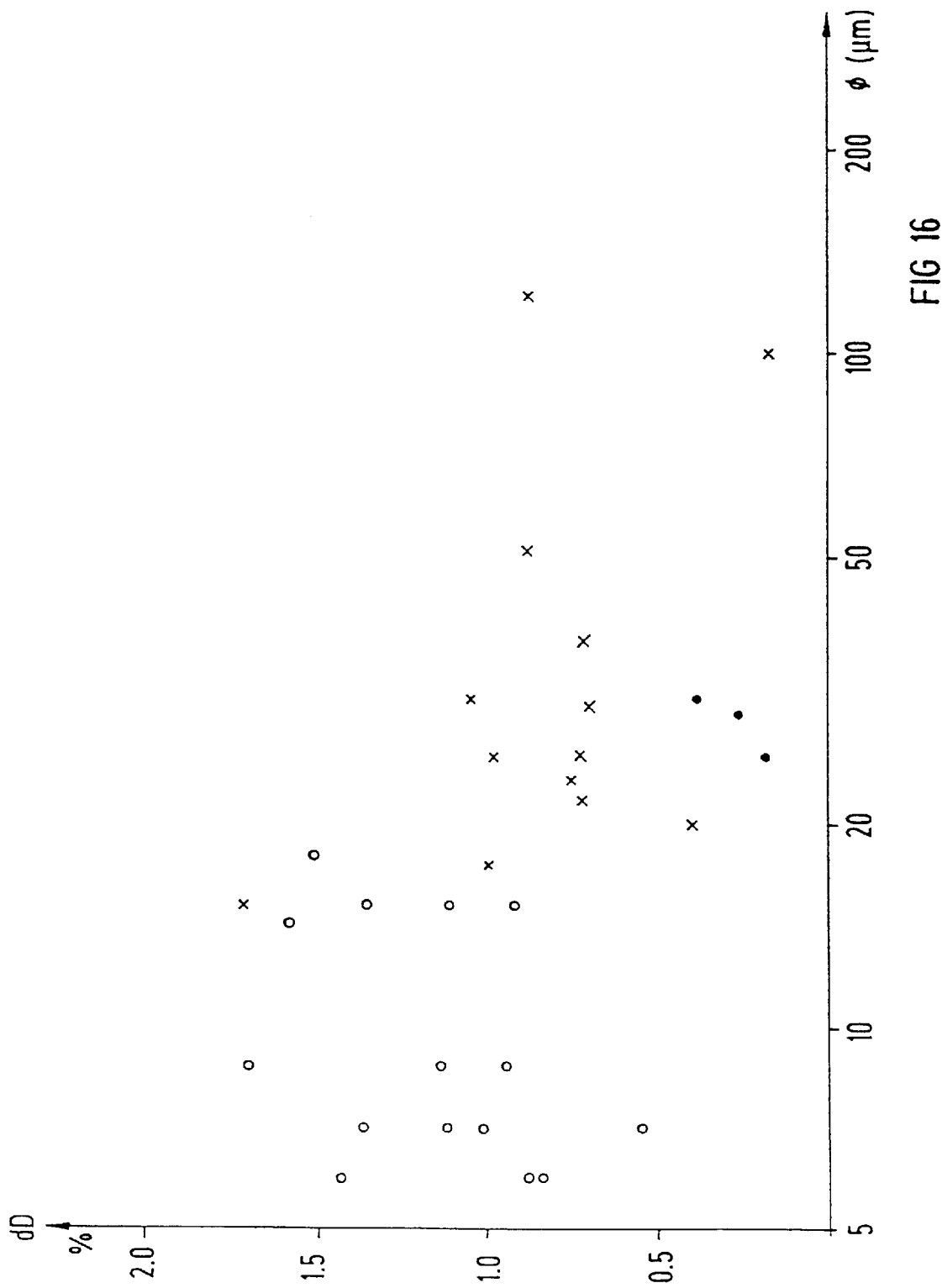

FIG. 16 Relationship of ductility to grain size.

MODES FOR CARRYING OUT THE INVENTION

The standard specimen geometry used in this test series is depicted in FIG. 1. The pipe wall (10) consists of one of the materials described in Table 1. Each pipe is filled with a pellet composed of a mixture of $Al_2O_3/B_4C$ that acts as an expansion mandrel when subjected to a neutron flux. The ratio of this $Al_2O_3/B_4C$ mixture is chosen depending on the amount of expansion desired. Samples are exposed to a neutron flux ranging between 1.33 and $2.5 \times 10^{21}$ n·cm$^{-2}$ which also results in different diameter changes that relatively increase up to 1.7. If the pipes withstand these expansions without damage, particularly without any stress corrosion cracks, then they have passed the test. If, however, damage occurs they are classified based on the maximum tolerated expansion at which no damage was observed.

In order to manufacture these pipes, melts are produced from materials which are classified as highly pure materials or which only have a minimal amount of scrap. It is advantages if these metals are remelted under vacuum, particularly when they have a higher scrap content, so that they may obtain the lowest possible content of silicon, phosphorous or sulfur.

The cooled billet from the melt is shaped into unfinished pipes with a 19 cm inner diameter and a 22 cm outer diameter in a resistance oven. From this rough pipe form a refined pipe form is shaped as illustrated in FIG. 1, after being annealed several times. Intermediate annealing takes place with induction heating in an argon atmosphere at controlled annealing temperatures.

Sample cross sections of materials manufactured in this manner, were examined using customary optical and electron microscope methods, both before and after corrosion tests. Each material was tested for chemical composition, range of grain size, and inclusions content. The chemical compositions of different test materials are listed in Table 1 and are identified by alloy numbers. Alloys bearing the numbers 460, 463, 480, 964, 965 and 966 correspond to Steel 1.4550 or AISI type 348, while Alloy Number 491 corresponds to Steel 1.4306 or AISI type 304, Each of these test alloys has a different niobium content.

The samples formed from these alloys were shaped into hallow pipe. Different annealing times and processing temperature were used, identified by capital letters in Table 2. The first line lists the resulting grain size obtained under a low temperature process ("LTP"), with the test alloys arranged in the order of decreasing niobium content. The LTP material underwent three to five intermediate annealings at 850° C. for a total of 240 minutes, and a final 60 minute annealing at 850° C.

The next line in Table 2 lists several specimens that were exposed to intermediate annealings at varying temperatures which lie within the indicated temperature ranges. The annealing duration (2 minutes for intermediate annealings) is also listed. The temperature for the final annealing (between 1075° C. and 1079° C.) and the duration (2 or 3 minutes) are also listed. All of these specimens lie within the standard annealing process ("STP") whose temperatures are barely above the customary annealing temperature of 1050° C.

Specimen Q which is listed as part of the next group, represents a transition to a high temperature process. The process involves four intermediate annealings at temperatures between 1068° C. and 1100 ° C., lasting 2 minutes, as well as a final annealing period of 2 minutes at 1100° C.

Specimen H is subjected to a high-temperature process, 2 minute intermediate annealings at temperatures between 1138 and 1189° C., and a final steady annealing which takes place at 748° C. for 100 hours.

In the following description of how temperature and niobium content effects the structure and corrosion resistance of these test alloys, it is suspected that a coarser grained structure with its reduced grain boundary surface is formed as temperature and homogeneity increase. Damaging impurities, with regard to SCC, Si, P and S are concentrated at the reduced grain boundary surfaces and aid selective corrosion there, despite the low level of these impurities in the test alloys. Something similar to this is true for carbon which can lead to the formation of chromium carbide and a corresponding reduction in corrosion inhibiting chromium at grain boundaries. Niobium carbide, particularly in a fine dispersed distribution, can act as collecting point for these impurities (i.e., the remaining base substance can largely be considered as highly pure and homogeneous) and hinder grain growth, i.e., the remainder of these damaging impurities are distributed over a larger surface and once dispersed have a difficult time to become concentrated. This invention gives rise to a material of high-purity and unexpectedly small grains whose boundaries are less susceptible to local corrosion.

The mean grain diameter values which were obtained through optical readings and by counting the intercept lengths of a representative grain population, are listed in Table 2, next to the capital letters which are used to identify the specimens. Reliable data is missing for specimens D, C and E since the grain sizes were determined using methods which are customary for suppliers of semi-finished products, said methods, however, not being consistent with the reliable diameter readings which are obtained increases from top left to bottom right, i.e., grain growth is less hindered by the decreasing niobium content and necessarily increases with annealing temnperatures.

Alloy number 964, i.e., specimens F, G and H, are examined next. The grain structure of these specimen is illustrated in FIGS. 2 and 4 which are also shown on a scale of 200:1, as FIGS. 7 and 8.

The grain diameters in specimen F (FIG. 2) were produced using a standard process and show a distribution around an average value of 7 µm. Specimen G (FIG. 4), which was produced with a low temperature process, also shows approximately the same average values. The grain sizes, particularly for longer annealing periods, have a relatively small scatter range. Specimen H (FIG. 3) clearly shows enlarged grains, whose mean diameter lies in the 26 µm range, produced using a high temperature process.

While enlarged grain size generally causes the grain surface of each individual grain to increase, the number of grains and the total grain surface of all grains actually decreased. FIG. 5 shows the correlation between grain diameter in µm and the grain boundary's overall surface or the corresponding ASTM Number which is contained in one cubic centimeter of the specimen. FIG. 6 shows the influence of grain size that comes about because of the niobium content when produced under the same temperature processes, on the ability of the alloy to deform in the reactor expansion tests. The dotted line R shows that customary steel qualities, which have not been purged of Si, P and S, show a susceptibility to IASCC for relatively low diameter changes, dD, of approximate 0.2%. This means that those materials cannot be used. The specimens shown in FIG. 6 are arranged by grain size diameter where the symbol "o" represents a sample that withstood the applied expansion without damage, while the symbol "(x)" points to light defects and the symbol "x" to considerable defects which renders the material useless. The combination of FIG. 6 and Table 2 shows that specimens produced in accordance with this invention have a grain diameter of approximately 20 µm and can withstand relative expansions of up to 1.5%.

The influence that niobium content has on grain sizes (Table 2) is shown in FIG. 4 (Specimen G), FIG. 7 (Specimen J) and FIG. 8 (Specimen L). Cross sectional photographs (scale of 1000:1) taken of specimen treated using these low temperature processes are shown in FIG. 9 (Specimen G), FIG. 10 (Specimen J) and FIG. 11 (Specimen L). In addition to occasionally occurring non-metallic inclusions which are to be considered as production errors (e.g., oxide and sulfide), and islands of isolated iron arranged in the form of lines of delta ferrite, there is a distribution of niobium containing precipitates whose density decreases as the alloy's niobium content decreases. FIG. 12 (Specimen F), FIG. 13 (Specimen H) and FIG. 14 (Specimen G), which are reproduced in a scale of 15,000:1, illustrate the relationship between these precipitates and temperature treatments for alloys with a high niobium content.

A non-uniform distribution of precipitates, caused by standard annealing temperatures, is indicated for Specimen F, whose maximum diameter lies between approximately 40 and 560 nm and are chemically alike. Besides traces of iron, chromium and nickel these precipitates have a niobium content of 90%. The niobium is actually in the form of niobium carbide. Almost no precipitates could be found that were an intermetallic between niobium and iron, or chromium, or nickel. Finely dispersed precipitates consisting primarily of niobium (and chromium poor) metal carbides, are typical for material with these chemical compositions.

Still higher intermediate annealings temperatures (high temperature process) partially promotes coarser carbide precipitates whereby the corresponding carbide precipitates take on a spherical shaped structure with particle diameters between 20 and 50 nm.

In Specimen H (FIG. 13) there are numerous needle-like precipitations with maximum diameters of 20 to 750 nm. Their composition consists of about 95% niobium, with residual amounts of iron, chromium and nickel, indicating niobium carbide.

Specimen G (FIG. 14) has a greater portion of the niobium rich precipitates in area 1 in relationship to the finely dispersed niobium carbide precipitates in area 2, which can more than likely be traced to formations which bind themselves to the excess niobium while the material is being manufactured, and which were not able to be transferred into the finely dispersed carbide during the low temperature process. These precipitates have a varying-type metal content which fluctuate between $Nb_2Fe_3$ and $Nb_2Fe_6$, whereby there are also small traces of Cr and Ni instead of iron, which points to an intermetallic phase. They are formed irregularly and have sizes between 0.25 and 1.5 $\mu$m (up to 3 $\mu$m), while the maximum diameter of fine dispersed carbide is only between 20 and 250 nm.

Different temperature treatments yield different results for expansion tests conducted under irradiation. FIG. 15 repeats the results of FIG. 6 with additional results for materials which are within the scope of temperature treatments contained in the present invention. These are plotted to the left of X line, while to the right of X line are listed the comparison statistics of other materials.

The chemical processes and conditions of the coolant in pressurized water reactors and boiling water reactors differ from one another. While no differentiation was made between these reactor types in FIGS. 6 and 15, FIG. 16 does show a summary of results for a pressurized water reactor. Expansion results for materials produced as per the invention are indicated with the symbol "o", while the symbol "x" is used to indicate relative diameter changes which resulted in damage to similar materials. The symbols "." and "+" represent undamaged and damaged diameter change, respectively, which occurred in commercial steel bearing German material No. 1.4981 which was also used in the comparison studies.

Other materials used which are listed in Table 3 were also prepared as per the invention and were subjected to practical reactor tests which yielded the same results.

To withstand irradiation assisted stress crack corrosion, the chemical composition of a material, particularly its high-purity with regards to Si, P and S (largely independent of other impurities such as, e.g., N) as well as its structure which is formed during the temperature treatment, is essential.

TABLE 1

| Alloy Number | Content ($10^{-3}$ Wt. %) | | | | | Content (Wt. %) | | | |
|---|---|---|---|---|---|---|---|---|---|
| | Si | P | S | C | N | Cr | Ni | Mn | Nb |
| 460 | 20 | <5 | 4 | 7 | 12 | 17 | 10 | 1.7 | 0.17 |
| 463 | 20 | <5 | 5 | 11 | 31 | 18 | 10 | 1.7 | 0.19 |
| 480 | 10 | <5 | 4 | 15 | 70 | 18 | 10 | 1.5 | 0.1 |
| 491 | <10 | <5 | 4 | 5 | 10 | 19 | 11 | 1.7 | <0.01 |
| 964 | 60 | <5 | 44 | 44 | 16 | 18 | 10 | 1.6 | 0.81 |
| 965 | 50 | <5 | 30 | 30 | 9 | 18 | 11 | 1.8 | 0.43 |
| 966 | 40 | <5 | 30 | 30 | 15 | 18 | 10 | 1.6 | 0.26 |

TABLE 2

| | Alloy Number (Nb Content) | | | | | | |
|---|---|---|---|---|---|---|---|
| Heat Treatment | 964 (0.81%) | 965 (0.43%) | 966 (0.26%) | 463 (0.19%) | 460 (0.17%) | 480 (0.16%) | 491 (—) |
| "LTP" | G(7 $\mu$m)* | J(15 $\mu$m) | L(6 $\mu$m) | O(7 $\mu$m) | N(9 $\mu$m) | P(14 $\mu$m) | T(18 $\mu$m) |
| "STP" | F(7 $\mu$m) 1077–1113° C. (2 min.) 1077° C.(3 min.) | I(15 $\mu$m) 1028–1140° C. (2 min.) 1075° C.(3 min.) | K(21 $\mu$m) 1057–1113° C. (2 min.) 1077° C.(3 min.) | D | C M(23 $\mu$m) 1080–1126° C. (2 min.) 1079° C.(3 min.) | E | S(29 $\mu$m) |
| "HTP" | H(26 $\mu$m) | | | | Q(37 $\mu$m) | | |

*Alloy letter identification (grain size).

TABLE 3

| Content (Wt. - %) | | | | | | | | |
|---|---|---|---|---|---|---|---|---|
| Si | P | S | C | N | Cr | Ni | Mn | Nb |
| 0.02 | 0.002 | 0.007 | 0.410 | 0.008 | 17.7 | 11.0 | 1.56 | 0.70 |
| 0.08 | 0.003 | 0.006 | 0.42 | 0.016 | 18.2 | 10.6 | 1.75 | 0.81 |

We claim:

1. A method of producing austenite steel for use in the radiation zone of a nuclear reactor, said method comprising the steps of:

forming said austenite steel with about 17% by weight chromium, about 9 to 11.5% by weight nickel, about 0.04% by weight carbon, and iron impurities whose content of silicon is about 0.1% by weight and whose total content of sulfur and phosphorous is less than 0.03% by weight; and exposing said austenite steel to a temperature treatment at a temperature less than 1150° C. to produce a fine grain lattice with grain diameter features under approximately 20, μm.

2. The method of claim 1 further including the step of subjecting said austenite steel to rough deformation prior to said exposing step.

3. The method of claim 1 wherein said exposing step is performed at a temperature of approximately 850° C.

4. The method of claim 1 wherein said forming step includes the step of using iron impurities whose total content of sulfur and phosphorous is less than 0.02% by weight.

5. The method of claim 1 wherein said forming step includes the step of using iron impurities whose total content of sulfur and phosphorous is less than 0.008% by weight.

6. The method of claim 1 wherein said forming step includes the step of forming said austenite steel with 2.0% by weight manganese.

7. The method of claim 1 wherein said forming step includes the step of forming said austenite steel with niobium in a niobium to carbon ratio of between about 10:1 and 30:1.

8. The method of claim 1 wherein said forming step includes the step of forming said austenite steel with manganese.

9. Austenite steel formed by the method of claim 1.

* * * * *